(12) United States Patent
Yang et al.

(10) Patent No.: US 12,289,702 B2
(45) Date of Patent: Apr. 29, 2025

(54) METHOD FOR CALCULATING LOCATION AND ELECTRONIC DEVICE THEREFOR

(71) Applicant: Samsung Electronics Co., Ltd., Suwon-si (KR)

(72) Inventors: Yi Yang, Suwon-si (KR); Moonseok Kang, Suwon-si (KR); Jonghoon Jang, Suwon-si (KR); Hyunchul Kim, Suwon-si (KR); Sejong Yoon, Suwon-si (KR); Sehwan Choi, Suwon-si (KR); Sukgi Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 17/673,719

(22) Filed: Feb. 16, 2022

(65) Prior Publication Data
US 2022/0174626 A1    Jun. 2, 2022

Related U.S. Application Data

(63) Continuation of application No. PCT/KR2020/009591, filed on Jul. 21, 2020.

(30) Foreign Application Priority Data

Aug. 16, 2019  (KR) ..................... 10-2019-0100352

(51) Int. Cl.
*H04W 56/00* (2009.01)
*G01S 5/06* (2006.01)
(Continued)

(52) U.S. Cl.
CPC ............ *H04W 56/005* (2013.01); *G01S 5/06* (2013.01); *G01S 5/10* (2013.01); *H04W 64/003* (2013.01)

(58) Field of Classification Search
CPC .................... H04W 56/005; H04W 64/003
See application file for complete search history.

(56) References Cited

U.S. PATENT DOCUMENTS 9,363,776 B2   6/2016  Gupta et al.
10,015,769 B1  7/2018  Younis
(Continued)

FOREIGN PATENT DOCUMENTS

KR   10-2010-0008158 A   1/2010
KR   10-2011-0131781 A   12/2011
(Continued)

OTHER PUBLICATIONS

International Search Report dated Nov. 3, 2020 in connection with International Patent Application No. PCT/KR2020/009591, 2 pages.
(Continued)

*Primary Examiner* — Zhiren Qin

(57) ABSTRACT

An electronic device according to various embodiments of the present disclosure comprises: at least one wireless communication module; and a processor, wherein the processor can control the wireless communication module to respectively receive a plurality of pieces of data from a plurality of external electronic devices, identify a time when each of the plurality of pieces of data has been received, and, when location information regarding the plurality of external electronic devices is included in the plurality of pieces of data, calculate the location of the electronic device by using a time difference in reception of the plurality of pieces of data and the location information regarding the plurality of external electronic devices. Various other embodiments are also possible.

8 Claims, 10 Drawing Sheets

(51) Int. Cl.
*G01S 5/10* (2006.01)
*H04W 64/00* (2009.01)

(56) References Cited

U.S. PATENT DOCUMENTS

| | | | |
|---|---|---|---|
| 10,559,149 B1* | 2/2020 | Kuechler | G07C 9/00309 |
| 2009/0160710 A1* | 6/2009 | Hwang | G01S 5/10 |
| | | | 342/387 |
| 2010/0309790 A1* | 12/2010 | Polakos | H04L 41/12 |
| | | | 370/254 |
| 2011/0291884 A1 | 12/2011 | Oh et al. | |
| 2012/0120874 A1 | 5/2012 | McLaughlin et al. | |
| 2013/0005347 A1* | 1/2013 | Curticapean | G01S 5/0226 |
| | | | 455/456.1 |
| 2013/0285856 A1* | 10/2013 | Opshaug | G01S 5/0244 |
| | | | 342/464 |
| 2014/0235266 A1* | 8/2014 | Edge | H04W 64/00 |
| | | | 455/456.1 |
| 2015/0063228 A1* | 3/2015 | Aldana | G01S 5/021 |
| | | | 370/329 |
| 2015/0188678 A1* | 7/2015 | Wu | G01S 1/14 |
| | | | 455/456.6 |
| 2016/0301492 A1* | 10/2016 | Wilhelmsson | H04W 74/0808 |
| 2017/0135063 A1 | 5/2017 | Bartov et al. | |
| 2018/0275284 A1* | 9/2018 | Sun | G01S 5/0236 |
| 2019/0137613 A1* | 5/2019 | Yan | G01S 13/08 |

FOREIGN PATENT DOCUMENTS

| | | |
|---|---|---|
| KR | 10-2014-0123237 A | 10/2014 |
| KR | 10-2016-0146033 A | 12/2016 |
| KR | 10-1836837 B1 | 3/2018 |
| KR | 10-2253830 B1 | 5/2021 |
| WO | 2018/170479 A1 | 9/2018 |

OTHER PUBLICATIONS

Written Opinion of the International Searching Authority dated Nov. 3, 2020 in connection with International Patent Application No. PCT/KR2020/009591, 6 pages.
Office Action dated Oct. 24, 2024, in connection with Korean Application No. 10-2019-0100352, 13 pages.

* cited by examiner

METHOD FOR CALCULATING LOCATION AND ELECTRONIC DEVICE THEREFOR

CROSS-REFERENCE TO RELATED APPLICATIONS

This application is a continuation of International Application No. PCT/KR2020/009591 filed on Jul. 21, 2020, which claims priority to Korean Patent Application No. 10-2019-0100352 filed on Aug. 16, 2019, the disclosures of which are herein incorporated by reference in their entirety.

BACKGROUND

1. Field

Various embodiments of the present disclosure relate to a method for calculating a location and an electronic device therefor.

2. Description of Related Art

As indoor spaces become complex as in a large shopping mall and people spend more time indoors, there are a growing number of services based on indoor location information. These services are diversifying as the performance of mobile terminals, such as smartphones, is improved and various indoor positioning methods are applied in real life. An example may be an indoor navigation service that shows a route indoors.

For location-based services in an indoor space, it is necessary to accurately identify the location of a moving object, such as a user or a terminal. That is, to provide a service based on the location of a moving object for a user, it is required to measure the location of the moving object indoors and to store and manage information about where the moving object is located.

A method for storing and managing location information about a moving object in an indoor space has constraints, for example, a gate and a restricted path, different from those in an outdoor space. Therefore, it is necessary to store and manage location information in consideration of these constraints. An existing method for storing and managing location information in an outdoor space may be used, but it may be more efficient to store and manage location information about a moving object in consideration of indoor constraints.

When calculating the location of an electronic device in a confined place or a place with a large number of obstacles, such as an indoor place, it is impossible to distinguish a signal received by reflection on a surrounding object from a signal directly received, thus reducing accuracy of the location.

To calculate the location, at least two devices need to transmit and receive signals to and from each other. In this case, a device carried by a user may basically need to transmit a signal thereof to another device, which may cause a security problem.

Since a plurality of electronic devices needs to transmit and receive data, there may be a limit on the number of electronic devices accommodatable per channel.

SUMMARY

An electronic device according to various embodiments of the present disclosure may include at least one wireless communication module, and a processor, wherein the processor may control the wireless communication module to receive a plurality of pieces of data from a plurality of external electronic devices, respectively, may identify times in which the plurality of pieces of data is respectively received, and may calculate a location of the electronic device using a time difference of arrival between the plurality of pieces of data and location information about the plurality of external electronic devices when the plurality of pieces of data includes the location information about the plurality of external electronic devices.

An electronic device according to various embodiments of the present disclosure may include at least one wireless communication module, and a processor, wherein the processor may control the wireless communication module to receive a plurality of pieces of data from at least one external electronic device, may determine a time for the electronic device to transmit data, based on the plurality of pieces of received data, and may control the wireless communication module to transmit the data to be transmitted at the determined time, wherein the data to be transmitted may include identification information or location information about the electronic device, and wherein the determined time may be determined based on a clock of any one of the external electronic device transmitting the pieces of received data.

An operating method of an electronic device according to various embodiments of the present disclosure may include: receiving a plurality of pieces of data from a plurality of external electronic devices, respectively; identifying times in which the plurality of pieces of data is respectively received; and calculating a location of the electronic device using a time difference of arrival between the plurality of pieces of data and location information about the plurality of external electronic devices when the plurality of pieces of received data includes the location information about the plurality of external electronic devices.

An operating method of an electronic device according to various embodiments of the present disclosure may include: receiving a plurality of pieces of data from at least one external electronic device; determining a time for the electronic device to transmit data, based on the plurality of pieces of received data; and transmitting the data to be transmitted at the determined time, wherein the data to be transmitted may include identification information or location information about the electronic device, and wherein the determined time may be determined based on a clock of any one of the external electronic device transmitting the pieces of received data.

According to various embodiments of the present disclosure, an electronic device may calculate the location thereof without transmitting information thereof, thus preventing personal information from leaking. Since the electronic device may determine the location thereof only by receiving data, the number of electronic devices accommodatable per channel may not be limited, and thus a channel capacity may not be limited.

According to various embodiments of the present disclosure, it is possible to distinguish a signal received by reflection, thereby increasing accuracy of location calculation.

According to various embodiments of the present disclosure, it is possible to provide advantages of both a two-way distance measurement method and a one-way distance measurement method and to synchronize electronic devices using received data.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, various embodiments disclosed herein will be described with reference to the attached drawings.

Figure 1:
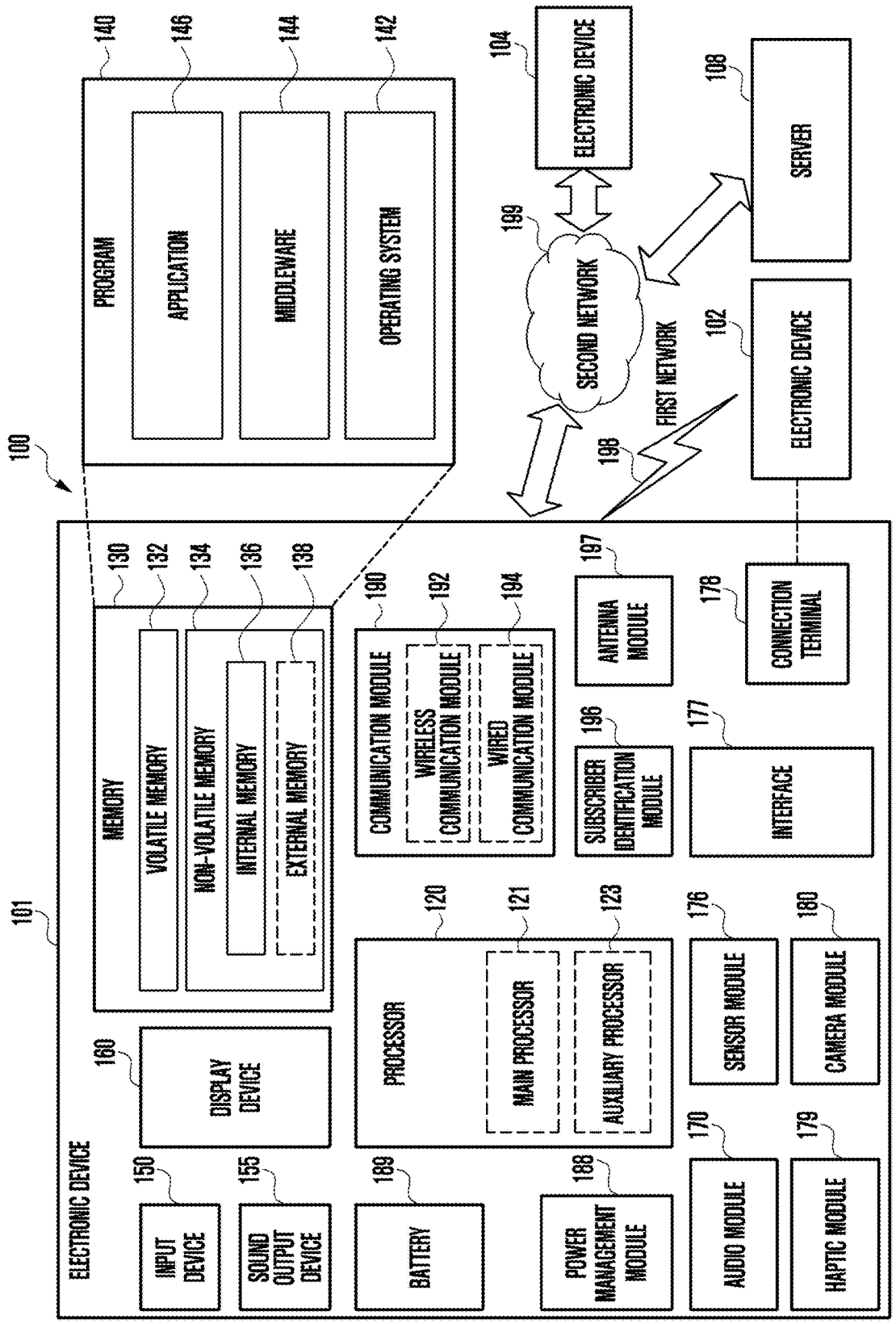
FIG. 1 is a block diagram illustrating an electronic device in a network environment according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In various embodiments of the present disclosure, a device transmitting a radio frequency (RF) to support a location calculation of an electronic device is described as an anchor, which may be divided into a master anchor and a slave anchor as necessary. This is for convenience of description, and all electronic devices performing a function described according to the present disclosure may be master anchors and/or slave anchors.

A master anchor and a slave anchor according to various embodiments of the present disclosure may include at least some of the components of the electronic device 101 illustrated in FIG. 1. The master anchor and the slave anchor according to various embodiments of the present disclosure may include a communication module (e.g., the communication module 190 of FIG. 1) supporting ultra-wideband (UWB) communication.

In various embodiments of the present disclosure, an ultra-wideband (UWB) frame is described as an example for convenience of description, but different data may be possible as long as the data includes information described according to the present disclosure.

Figure 2:
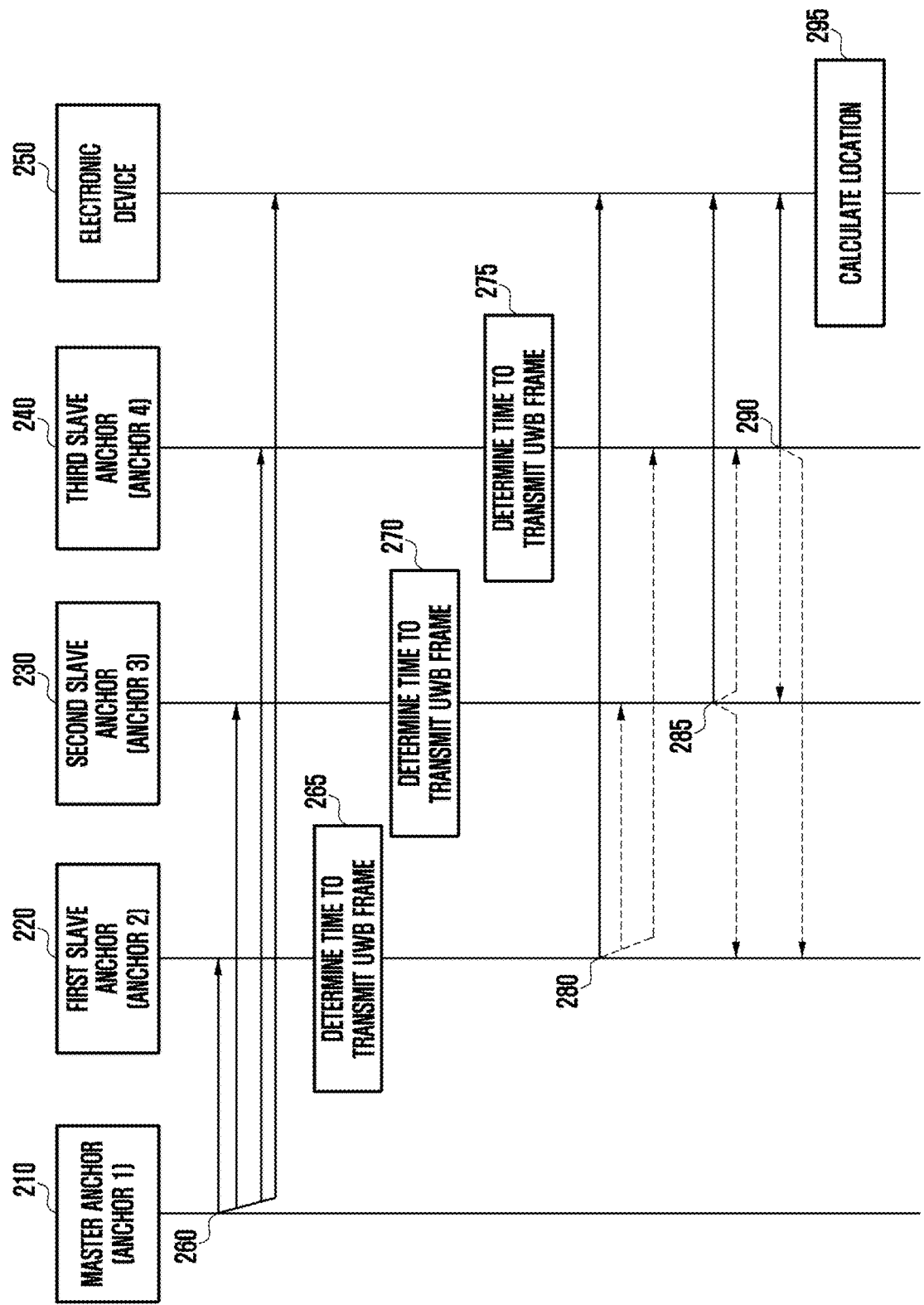
FIG. 2 is a sequence diagram of an entire system according to various embodiments of the present disclosure.

FIG. 2 is a sequence diagram of a system for calculating the location of an electronic device according to various embodiments of the present disclosure.

The system may include a master anchor (e.g., the electronic device 101 of FIG. 1) 210 as a first anchor and a plurality of slave anchors (e.g., the electronic device 101 of FIGS. 1) 220 to 240. In FIG. 2, three anchors may be slave anchors, and second, third, and fourth anchors may be first, second, and third slave anchors 220, 230, and 240. According to various embodiments of the present disclosure, the master anchor 210 may know in advance the number of slave anchors included in the system.

In operation 260, the master anchor 210 may transmit a UWB frame at a predetermined time interval. The predetermined time interval may be referred to as a round interval.

The first, second, and third slave anchors 220, 230, 240 and an electronic device 250 (e.g., the electronic device 101 of FIG. 1) may receive the UWB frame transmitted by the master anchor 210 at the predetermined time interval. The UWB frames received by the first, second, and third slave anchors 220, 230, 240 and the electronic device 250 may be the same UWB frame. The first, second, and third slave anchors 220, 230, 240 and the electronic device 250 may receive the same UWB frame with a time difference according to locations.

In operation 265, the first slave anchor 220 may determine a time for the first slave anchor 220 to transmit a UWB frame using the received UWB frame. A method for determining the time for the first slave anchor 220 to transmit the UWB frame is described in detail with reference to FIG. 9.

In operation 270, the second slave anchor 230 may determine a time for the second slave anchor 230 to transmit a UWB frame using the received UWB frame. A method for determining the time for the second slave anchor 230 to transmit the UWB frame may be the same as or similar to the method for determining the time for the first slave anchor 220 to transmit the UWB frame.

In operation 275, the third slave anchor 240 may also determine a time for the third slave anchor 240 to transmit a UWB frame using the received UWB frame. Similarly, a method for determining the time for the third slave anchor 240 to transmit the UWB frame may be the same as or similar to the methods for determining the time for the first and second slave anchors 220 and 230 to transmit the UWB frame.

In operation 280, the first slave anchor 220 may transmit the UWB frame at the determined time. The electronic device 250 may receive the UWB frame transmitted by the first slave anchor 220. Optionally, the second and third slave anchors 230 and 240 may also receive the UWB frame transmitted by the first slave anchor 220. The second and third slave anchors 230 and 240 may not only determine the times for the second and third slave anchors 230 and 240 to transmit the UWB frame by receiving the UWB frame transmitted by the master anchor 210 but also determine the times for the second and third slave anchors 230 and 240 to transmit the UWB frame by receiving the UWB frame transmitted by the first slave anchor 220, which is described in detail with reference to FIG. 9.

In operation 285, the second slave anchor 230 may transmit the UWB frame at the determined time. The electronic device 250 may receive the UWB frame transmitted by the second slave anchor 230. Optionally, the first and third slave anchors 220 and 240 may also receive the UWB frame transmitted by the second slave anchor 230. The first and third slaves 220 and 240 may also receive the UWB frame transmitted by the second slave anchor 230 and may determine the times for the first and third slaves 220 and 240 to transmit the UWB frame, which is described in detail with reference to FIG. 9.

In operation 290, the third slave anchor 240 may transmit the UWB frame at the determined time. The electronic device 250 may receive the UWB frame transmitted by the third slave anchor 240. Optionally, the first and second slave anchors 220 and 230 may also receive the UWB frame transmitted by the second slave anchor 230. As described above, the first and second slaves 220 and 230 may also receive the UWB frame transmitted by the third slave anchor 240 and may determine the times for the first and second slaves 220 and 230 to transmit the UWB frame, which is described in detail with reference to FIG. 9.

Although not shown in FIG. 2, the master anchor 210 may also receive the UWB frames transmitted by the first to third slave anchors 220 to 240.

A time interval between transmissions of the UWB frames by the slave anchors (e.g., 220 to 240) may be referred to as a slot interval.

In operation 295, the electronic device 250 may calculate the location thereof using the received UWB frames. The received UWB frames may include identification information and/or location information about a transmitting anchor. For example, the identification information may include an address (e.g., a media access control (MAC) address) or a personal area network identification of an anchor.

According to various embodiments of the present disclosure, the identification information about anchor may be included in a MAC header, and the location information about the anchor may be included in a MAC payload.

Figure 3:
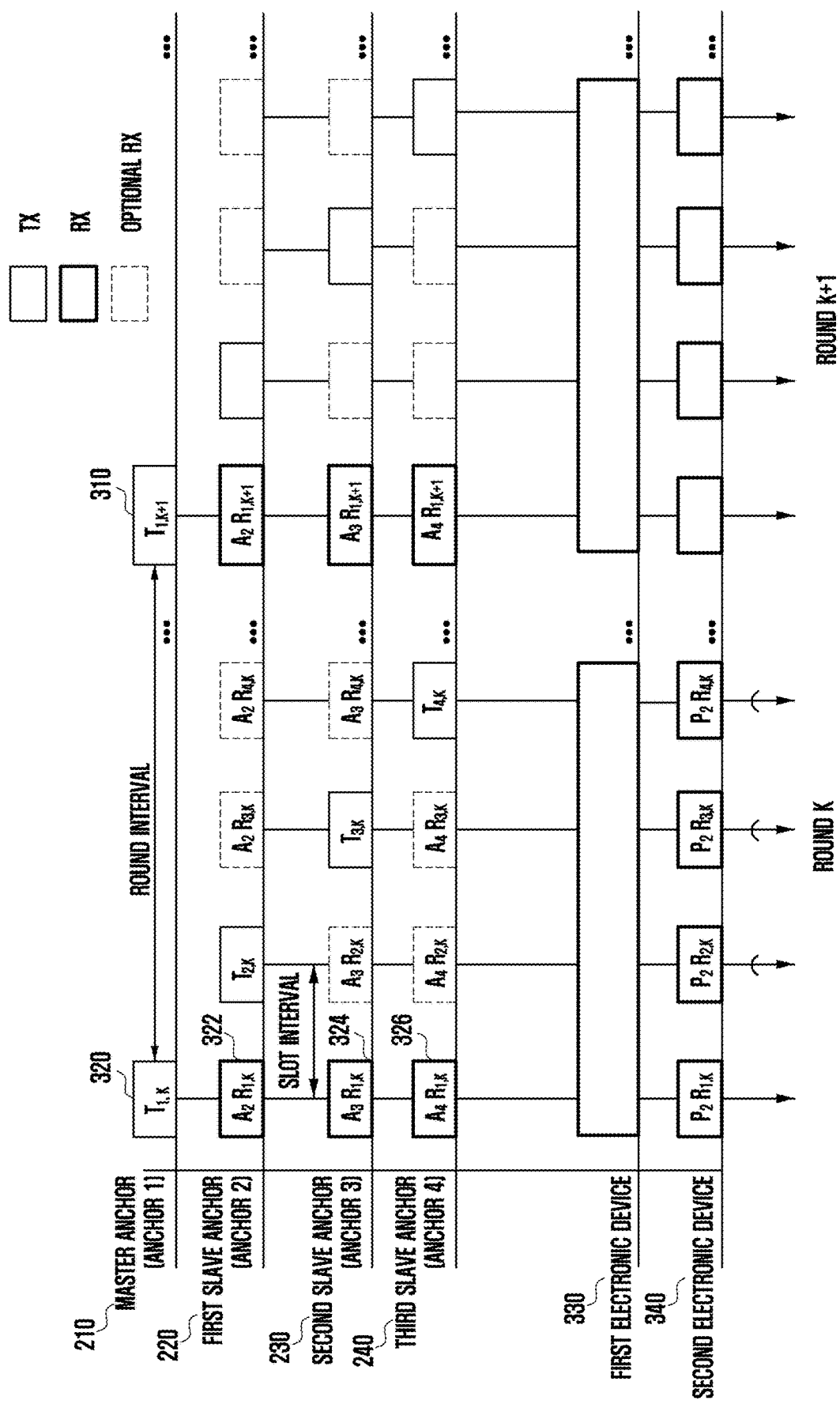
FIG. 3 is a flowchart of a UWB frame transmitted according to FIG. 2.

FIG. 3 is a flowchart of a UWB frame transmitted according to FIG. 2.

A master anchor 210 (e.g., anchor index-1) may transmit a UWB frame 320 at a predetermined time $T_{1,k}$. In $T_{1,k}$, a first subscript of 1 may denote the index of an anchor transmitting a UWB frame, and a second subscript of k may denote the index of a ranging round. For example, a time which is a k-th ranging round and in which a first anchor, which is the master anchor 210, transmits a UWB frame may be represented by $T_{1,k}$, and $T_{1,k}$ may be a time stamp according to a clock of the master anchor 210.

The transmitted UWB frame 320 may be received by first, second, and third slave anchors 220, 230, and 240 and/or first and second electronic devices 330 and 340 (e.g., the electronic device 101 of FIG. 1).

A time in which a slave anchor receives the UWB frame (e.g., 320) transmitted by the master anchor 210 may be represented by $A_xR_{1,k}$, where x may denote the index of the anchor receiving the UWB frame, l may denote the index of the anchor transmitting the UWB frame, and k may denote the index of a ranging round. For example, in the k-th ranging round, a time in which the first slave anchor 220 (e.g., anchor index-2) receives a UWB frame 322 may be represented by $A_2R_{1,k}$, a time in which the second slave anchor 230 (e.g., anchor index-3) receives a UWB frame 324 may be represented by $A_3R_{1,k}$, and a time in which the third slave anchor 240 (e.g., anchor index-4) receives a UWB frame 326 may be represented by $A_4R_{1,k}$. The time (e.g., $A_2R_{1,k}$, $A_3R_{1,k}$, or $A_4R_{1,k}$) in which the first, second, or third slave anchor 220, 230, or 240 receives the UWB frame may be a time stamp according to a clock of the first, second, or third slave anchor. Also, a time of fly (TOF) between two anchors, for example, the master anchor 210 and the first slave anchor 220, may be represented by $Tof_{1,2}$. Here, 1 and 2 may denote the index of the transmitting anchor and the index of the receiving anchor.

A relational expression for the time in which the first slave anchor 220 receives the UWB frame transmitted from the master anchor 210 in the k-th ranging round may be represented by Equation 1 as given by:

$$A_2R_{1,k}=f(T_{1,k}+X_k)+\theta+Tof_{1,2}. \text{[Equation 1]}$$

$$\approx$$

$$\approx \text{[Equation 2]}$$

A matrix formed using time stamps with respect to a plurality of UWB transmission times and a plurality of UWB reception times may be represented by Equation 3 as given by:

$$\begin{bmatrix} A_2R_{1,1} \\ A_2R_{1,2} \\ \vdots \\ A_2R_{1,N} \end{bmatrix} = f \begin{bmatrix} T_{1,1} \\ T_{1,2} \\ \vdots \\ T_{1,N} \end{bmatrix} + \begin{bmatrix} X_1 \\ X_2 \\ \vdots \\ X_N \end{bmatrix} + \theta + Tof_{1,2} \quad \text{[Equation 3]}$$

The slave anchor 220, 230, or 240 or the electronic device 330 or 340 receiving the UWB frame may apply least squares (LS) to f and θ using Equation 3.

Further, when a figure of merit (FOM) can be obtained from the chip manufacturer of the first slave anchor 220, Equation 3 may be expressed as Equation 4, and accordingly the slave anchor 220, 230, or 240 or the electronic device 330 or 340 receiving the UWB frame may apply weighted least squares (WLS) to f and θ. Equation 4 is given by:

$$\begin{bmatrix} A_2R_{1,1} \\ A_2R_{1,2} \\ \vdots \\ A_2R_{1,N} \end{bmatrix} \begin{bmatrix} w_{1,1} & 0 & 0 & 0 \\ 0 & w_{1,2} & 0 & 0 \\ 0 & 0 & \ldots & 0 \\ 0 & 0 & 0 & w_{1,N} \end{bmatrix} = \quad \text{[Equation 4]}$$

$$f \begin{bmatrix} T_{1,1} \\ T_{1,2} \\ \vdots \\ T_{1,N} \end{bmatrix} + \begin{bmatrix} X_1 \\ X_2 \\ \vdots \\ X_N \end{bmatrix} + \theta + Tof_{1,2}$$

According to various embodiments of the present disclosure, the master anchor 210 may schedule a time to transmit and receive UWB frames in view of the number of slave devices 220 to 240. The master anchor 210 may insert $T_{1,k}$ into a MAC payload when transmitting the UWB frame, and the first slave anchor 220 may analyze the received UWB frame to discover $T_{1,k}$. The master anchor 210 may also insert a time $T_{2,k}$ in which the first slave anchor 220 transmits a UWB frame into the MAC payload. $T_{2,k}$ may be a timestamp according to the clock of the master anchor 210. Therefore, the first slave anchor 220 may discover information about the clock of the master anchor 210 using f and θ found through Equation 3 or Equation 4 and may transmit a UWB frame according to the clock of the master anchor 210.

In this manner, all the slave anchors 220 to 240 may discover a time in which the slave anchors 220 to 240 need to transmit a UWB frame. A slave anchor that has failed to receive the UWB frame from the master anchor may receive a UWB frame transmitted by other slave anchors and may discover a time when the slave anchor needs to transmit a UWB frame in the same manner as above.

The master anchor 210 may transmit UWB frames 310 and 320 at a predetermined time interval (e.g., a round interval).

Hereinafter, a method for first and second electronic devices 330 and 340 to calculate locations thereof according to various embodiments of the present disclosure will be described in detail.

According to various embodiments of the present disclosure, the first electronic device 330 may always operate in a reception mode to receive a UWB frame transmitted from the master anchor 210 or the slave anchors 220 to 240.

According to various embodiments of the present disclosure, the second electronic device 340 may calculate a time in which a UWB frame is transmitted from the master anchor 210 or the slave anchors 220 to 240 and may operate in the reception mode only during the time. Since the second electronic device 340 calculates the time in which the UWB frame is transmitted, the second electronic device 340 may be in a standby mode outside the calculated time, thus saving power.

For example, the second electronic device 340 may calculate a time difference of arrival (TDOA) of the UWB frame using Equation 5 as given by:

[Equation 5]

$$TDOA_{i,j,k} = P_l R_{j,k} - P_l R_{i,k} - T_{j,k} + T_{i,k}.$$

In Equation 5, l may be the index of the second electronic device 340, i and j may be the indexes of anchors, and k may be the index of a ranging round. $P_l R_{j,k}$ and $P_l R_{i,k}$ may denote a time in which the second electronic device 340 receives a UWB frame from anchor i and anchor j in the k-th ranging round, and $T_{j,k}$ and $T_{i,k}$ may denote times in which anchor i and anchor j transmit the UWB frame.

$T_{j,k}$ and $T_{i,k}$ may be included in the received UWB frame. For example, $T_{j,k}$ and $T_{i,k}$ may be included in a payload of the UWB frame, and the second electronic device 340 may separate $T_{j,k}$ and $T_{i,k}$. $P_l R_{j,k}$ and $P_l R_{i,k}$ may be times according to a clock of the second electronic device 340, and $T_{j,k}$ and $T_{i,k}$ may be times according to the clock of the master anchor 210.

The first and second electronic devices 330 and 340 may calculate the locations of the first and second electronic devices 330 and 340 using the locations of the anchors and a time taken for a UWB frame after a calculated UWB frame to arrive or a time taken for a UWB frame after a measured UWB frame to arrive. The locations of the anchors 210 to 240 may be three-dimensional information of x, y, and z or two-dimensional information of x and y. When the first and second electronic devices 330 and 340 receive UWB frames from a plurality of anchors 210 to 240 and calculate the locations, the first and second electronic devices 330 and 340 may calculate the locations thereof without exposing information thereof to the outside.

According to various embodiments of the present disclosure, when an electronic device (e.g., the first or second electronic device 330 or 340) cannot know the locations of anchors (e.g., the master anchor 210, the first slave anchor 220, and the second slave anchor 230, or the third slave anchor 240), the electronic device (e.g., the first or second electronic device 330 or 340) may transmit a time taken for a UWB frame after a calculated UWB frame to arrive or a time taken for a UWB frame after a measured UWB frame to arrive and identification information about the anchors, which is a MAC address, to a server (e.g., the server 108 of FIG. 1) and may receive location information about the electronic device from the server 108. However, in this case, the electronic device (e.g., the first or second electronic device 330 or 340) needs to transmit information thereof to the server 108, and thus the location thereof may be exposed to the outside.

The electronic device (e.g., the first or second electronic device 330 or 340) and a slave anchor (e.g., the first slave anchor 220, the second slave anchor 230, or the third slave anchor 240) may directly receive a UWB frame transmitted from the master anchor 210 or another slave anchor (e.g., the first slave anchor 220, the second slave anchor 230, or the third slave anchor 240) and may also receive a reflected UWB frame. Hereinafter, a problem that may occur when a reflected UWB frame is received and various embodiments according to the present disclosure for solving the problem is described.

Figure 4:
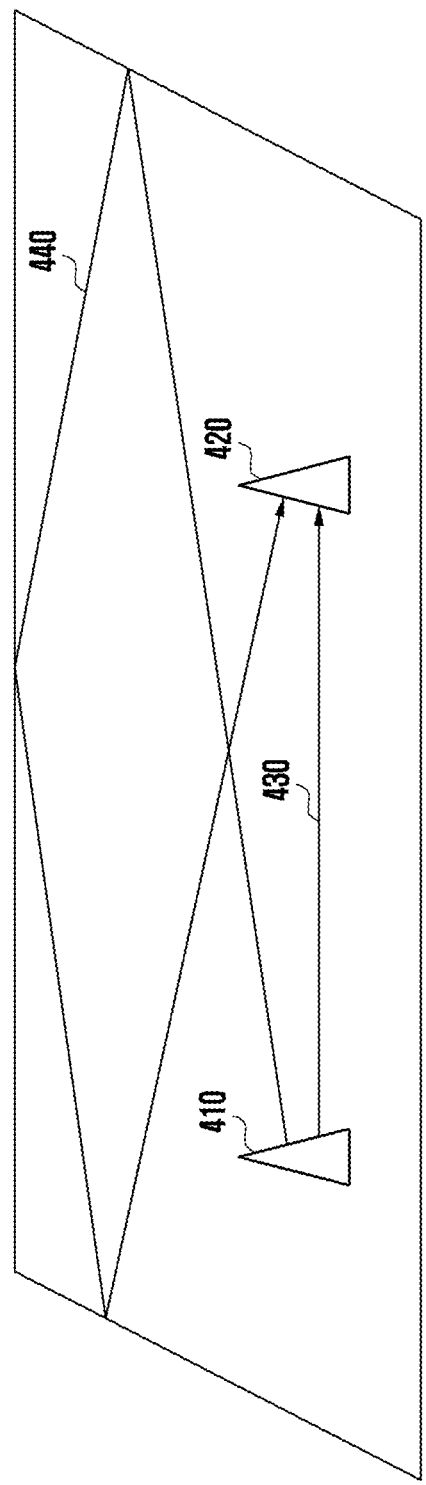
FIG. 4 illustrates an example in which a reflected UWB frame is received.

FIG. 4 illustrates an example in which a reflected UWB frame is received.

For example, a plurality of anchors (e.g., 210 to 240 in FIG. 3) and an electronic device (e.g., 330 or 340 in FIG. 3) may be disposed, for example, in an indoor place with many obstacles. The plurality of anchors and the electronic device may transmit and receive a UWB frame to calculate a location or to measure the distance therebetween. Here, the electronic device (e.g., 330 or 340 in FIG. 3) may directly receive a UWB frame transmitted from the anchors (e.g., 210 to 240 in FIG. 3) but may also receive a UWB frame reflected by an obstacle.

FIG. 4 shows an example in which, in a confined place, a first electronic device 410 (e.g., the electronic device 101 of FIG. 1) transmits a UWB frame and a second electronic device 420 (e.g., the electronic device 101 of FIG. 1) receives the UWB frame so that the first electronic device 410 and the second electronic device 420 measure the distance therebetween or calculate a location.

Referring to FIG. 4, the UWB frame transmitted by the first electronic device 410 may be directly received by the second electronic device 420 (430). The UWB frame transmitted by the first electronic device 410 may also be received by the second electronic device 420 after being reflected by a wall or an obstacle (440). A problem that may occur when the UWB frame is received after being reflected by the wall is described in detail with reference to FIG. 5.

Figure 5:
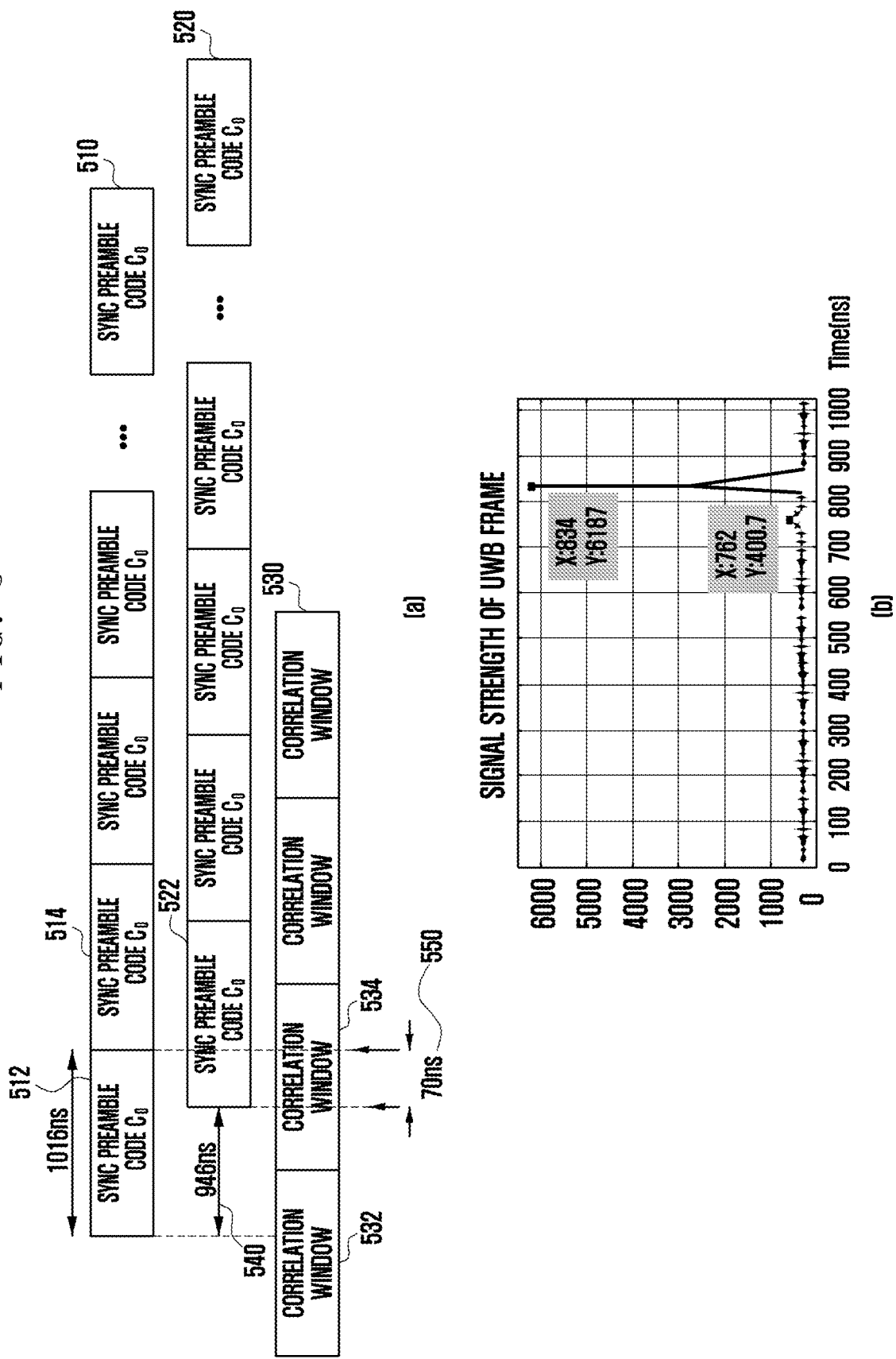
FIG. 5 illustrates data including a sync preamble code and the strength of a signal through which the data is received according to various embodiments of the present disclosure.

FIG. 5 illustrates a portion of a UWB frame including a sync preamble code and the strength of a signal through which the UWB frame is received according to various embodiments of the present disclosure.

FIG. 5A illustrates a portion of a UWB frame received by an electronic device (e.g., the second electronic device 420 of FIG. 4), in which first data 510 shows a portion of the UWB frame (e.g., 430 of FIG. 4) directly received, and second data 520 shows a portion of the UWB frame (e.g., 440 in FIG. 4) received after being reflected by an obstacle (e.g., a wall). FIG. 5A also shows a correlation window 530 for calculating a distance.

For example, a sync preamble code $C_0$ may be repeatedly included in the first data 510 and the second data 520. It may be assumed that the length of one sync preamble code is 1016 ns (e.g., preamble codes 512, 514, 522), and the second data 520 received after being reflected is received 946 ns (540) later than the first data 510.

In FIG. 5A, since a plurality of sync preamble codes is all the same, the electronic device 420 cannot determine whether the received data is received via reflection or is directly received. Even though it is assumed that the electronic device 420 knows whether there is the reflected data, the electronic device 420 may determine that the data is received 946 ns (540) later when comparing a time in which a first sync preamble code 512 of the first data is received with a time in which a first sync preamble code 522 of the second data is received, or may determine that the data is received 70 ns (550) later when comparing a time in which a second sync preamble code 514 of the first data is received with a time in which the first sync preamble code 522 of the second data is received. These results may vary according to the correlation window 530.

As shown in FIG. 5A, when the electronic device 420 measures the distance using a correlation window 532, since only the first sync preamble code 512 of the first data is received, the measured distance may be accurate. However, when the electronic device 420 measures the distance using a correlation window 534, both the first sync preamble code 522 of the second data, which is reflected data, and the second sync preamble code 514 of the first data, which is directly received data, may be received, and the first sync preamble code 522 of the second data may be detected before the second sync preamble code 514 of the first data. In this case, the electronic device 420 may measure the distance using the first sync preamble code 522 of the second data detected first. FIG. 5B illustrates the signal strength of data received by the electronic device 420 when the correlation window 523 is used.

According to FIG. 5B, since the first sync preamble code 522 of the second data received first is received after being reflected, the signal strength may be weak. However, since the second sync preamble code 514 of the first data received later is directly received, the signal strength may be strong. However, since the mutual distance does not consider the signal strength, the earlier data is received, the closer the distance may be determined. Accordingly, it may be determined that another electronic device exists due to the first sync preamble code 522 of the second data received after being reflected.

Hereinafter, a method for distinguishing data received after being reflected and directly received data using a scrambled timestamp sequence (hereinafter, "STS") code according to various embodiments of the present disclosure is described.

Figure 6:
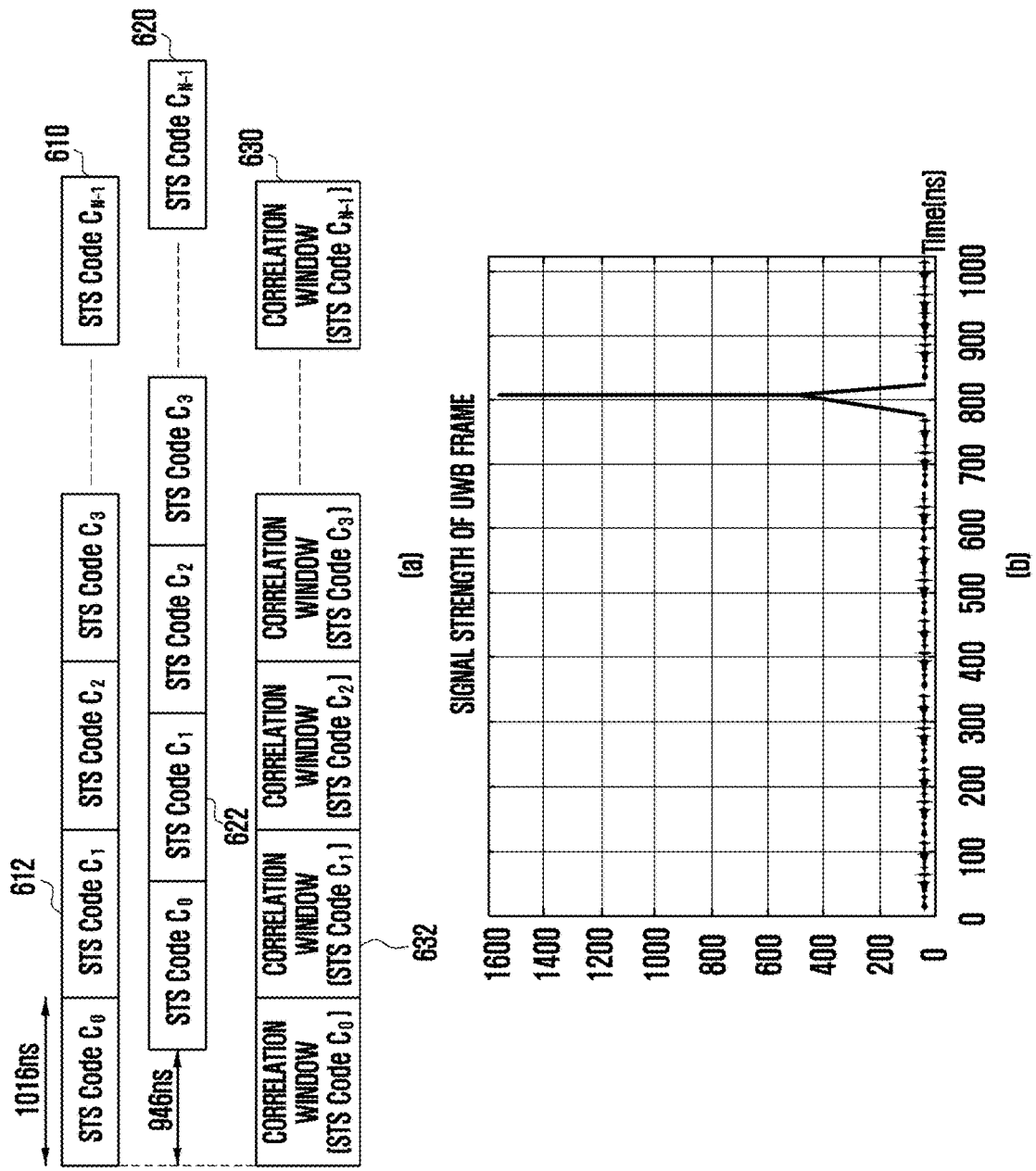
FIG. 6 illustrates data including an STS code and the strength of a signal through which the data is received according to various embodiments of the present disclosure.

FIG. 6 illustrates a portion of a UWB frame including an STS code and the strength of a signal through which the UWB frame is received according to various embodiments of the present disclosure.

FIG. 6A shows first data 610 directly received by an electronic device (e.g., the second electronic device 420 of FIG. 4), second data 620 received after being reflected by an obstacle (e.g., a wall, an object, or a human being), and a correlation window 630.

According to various embodiments of the present disclosure, to distinguish a UWB frame received after being reflected from a directly received UWB frame, an STS code $C_x$ may be included in the UWB frames instead of a sync preamble code. Since all STS codes $C_x$ are different and thus all correlation windows are different, the electronic device 420 may analyze a received UWB frame, thereby determining whether the received UWB frame is received after being reflected or is directly received. For example, when analyzing a UWB frame using a correlation window 632, the electronic device 420 may analyze only a second STS code $C_1$ 612 of first data and a second STS code $C_1$ 622 of second data, thus determining that the second STS code $C_1$ 612 of the first data received first is directly received and the second STS code $C_1$ 622 of the second data received later is received after being reflected.

FIG. 6B illustrates the signal strength of the second STS code $C_1$ 612 of the first data directly received by the electronic device 420. The electronic device 420 may calculate the distance to an electronic device (e.g., the first electronic device 410 of FIG. 4) calculated using the second STS code $C_1$ 612 of the first data.

When the STS code $C_x$ is included in a UWB frame, the electronic device 420 may determine whether the UWB frame is received by reflection or is directly received, thus calculating an accurate location.

According to various embodiments of the present disclosure, an electronic device (e.g., 250 of FIG. 2) needs to know an STS seed and an STS index in order to determine the STS code $C_x$. When the electronic device 250 uses a non-secure STS code $C_x$, the electronic device 250 knows an STS seed (or STS key) and an STS index (or STS nonce), and thus a master anchor (e.g., the master anchor 210 of FIG. 2) may not transmit the STS seed and the STS index. However, when the electronic device 250 uses a secure STS code $C_x$, the electronic device 250 needs to know an STS seed and an STS index, and thus the master anchor 210 may include the STS seed and the STS index in a payload of a UWB frame and may transmit the UWB frame.

Figure 7:
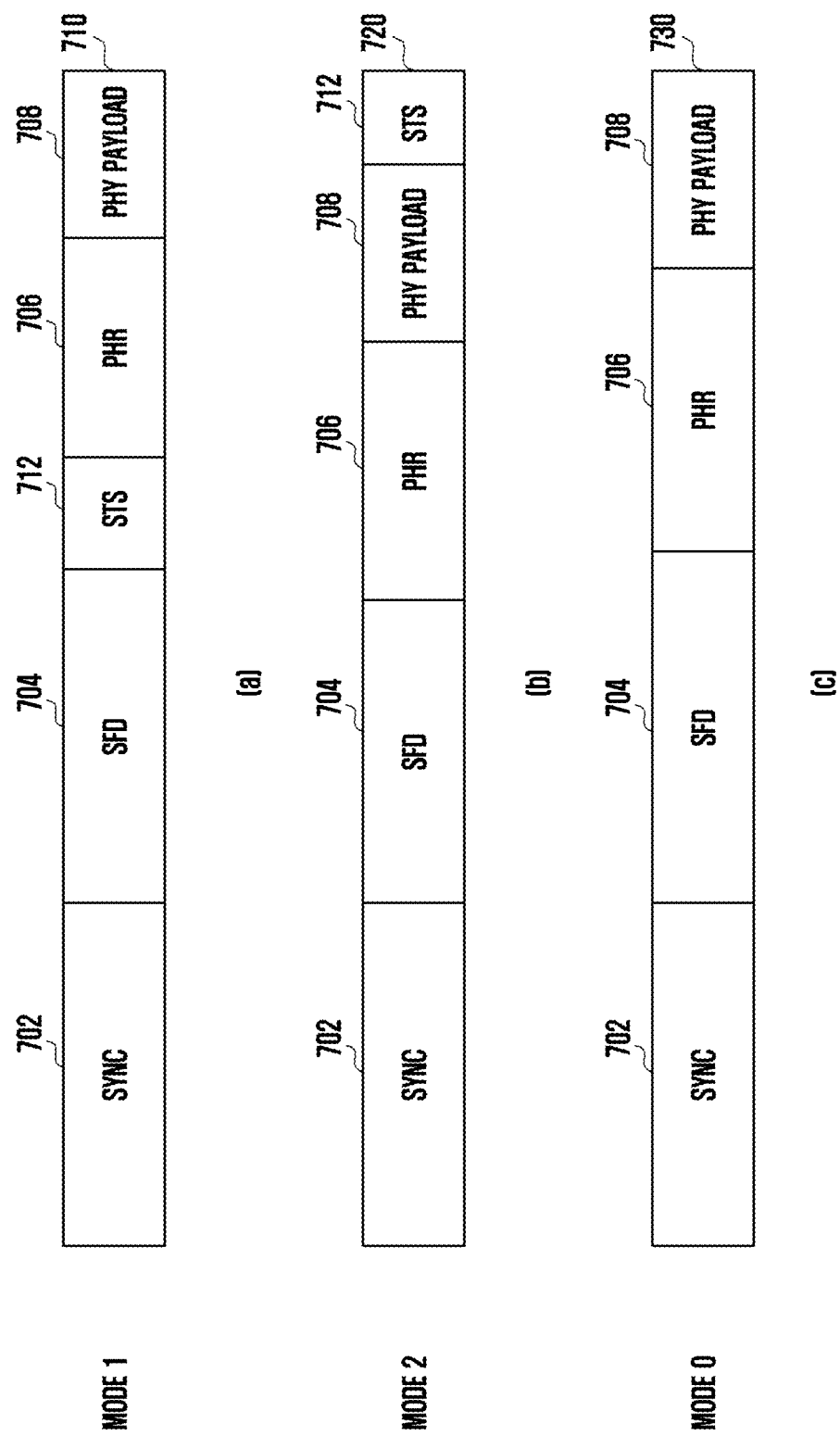
FIG. 7 illustrates a format of data when a non-secure STS is used according to various embodiments of the present disclosure.

FIG. 7 illustrates a format of a UWB frame according to various embodiments of the present disclosure.

Formats of a UWB frame may be divided into a high rate pulse (hereinafter, "HRP") mode and a low rate pulse (hereinafter, "LRP") mode in which a data rate and a transmission range vary. FIGS. 7A to 7C show a format of a UWB frame in the high rate pulse mode.

FIGS. 7A and 7B show high rate pulse modes 1 710 and 2 720, in which the UWB frame may include an STS code $C_x$. FIG. 7C shows high rate pulse mode 0 730, in which no STS code $C_x$ may be included.

The UWB frame may include a sync field 702. A preamble code may be repeatedly included in the sync field 702. The size of the UWB frame may be determined by the length of the sync field.

The UWB frame may include a start of frame delimiter (SFD) field 704. The SFD field 704 may indicate a data rate. When the length of the SFD field 704 is short, the data rate may be normal, and when the length of the SFD field 704 is long, the data rate may be low.

The UWB frame may include a physical layer header (PHR) field 706. The PHR field 706 may include information about the data rate of a received PHY payload field and a current frame length.

The UWB frame may include a PHY payload field 708. The PHY payload field 708 may include a PHY service data unit (PSDU), which is data transferred between physical layers.

The UWB frame may include an STS field 712 described above according to a mode. When an electronic device (e.g., the electronic device 250 of FIG. 2) uses a secure STS code $C_x$, a master anchor (e.g., the master anchor 210 of FIG. 2) may transmit information about an STS seed and an STS index via the PHY payload field 708 of the UWB frame.

Figure 8:
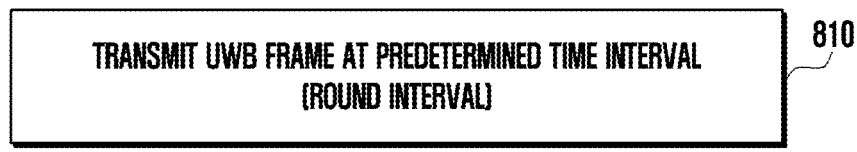
FIG. 8 illustrates an operation of a first electronic device supporting location calculation of a second electronic device according to various embodiments of the present disclosure.

FIG. 8 illustrates an operation of a master anchor supporting location calculation of an electronic device according to various embodiments of the present disclosure.

In operation 810, a master anchor (e.g., the master anchor 210 of FIG. 2) transmits data (e.g., 310 and 320 of FIG. 3) at a predetermined time interval (round interval) to support location calculation of an electronic device (e.g., the electronic device 250 of FIG. 2). The master anchor 210 may receive data transmitted by slave anchors (e.g., 220 to 240 in FIG. 2) or the electronic device 250 but may process the data only when necessary.

The master anchor 210 may know the number, location information, and/or identification information of the slave anchors 220 to 240 and may adjust an interval (round interval) for transmitting a UWB frame in view of the number of slave anchors. The master anchor 210 may indicate an interval (slot interval) at which the slave anchors 220 to 240 transmit a UWB frame via the UWB frame in view of the number of slave anchors. The information about the slave anchors 220 to 240 may be input in initial installation of the master anchor 210 or may be input later as necessary.

The transmitted UWB frame may be received by at least one slave anchor 220 to 240 and/or the electronic device 250. The transmitted UWB frame may include a non-secure STS code or a secure STS code. When the secure STS code is used, an STS seed and an STS index may be included in a payload of the UWB frame. When no STS code is included in the transmitted UWB frame, the electronic device 250 may determine the location thereof using a sync preamble code.

Figure 9:
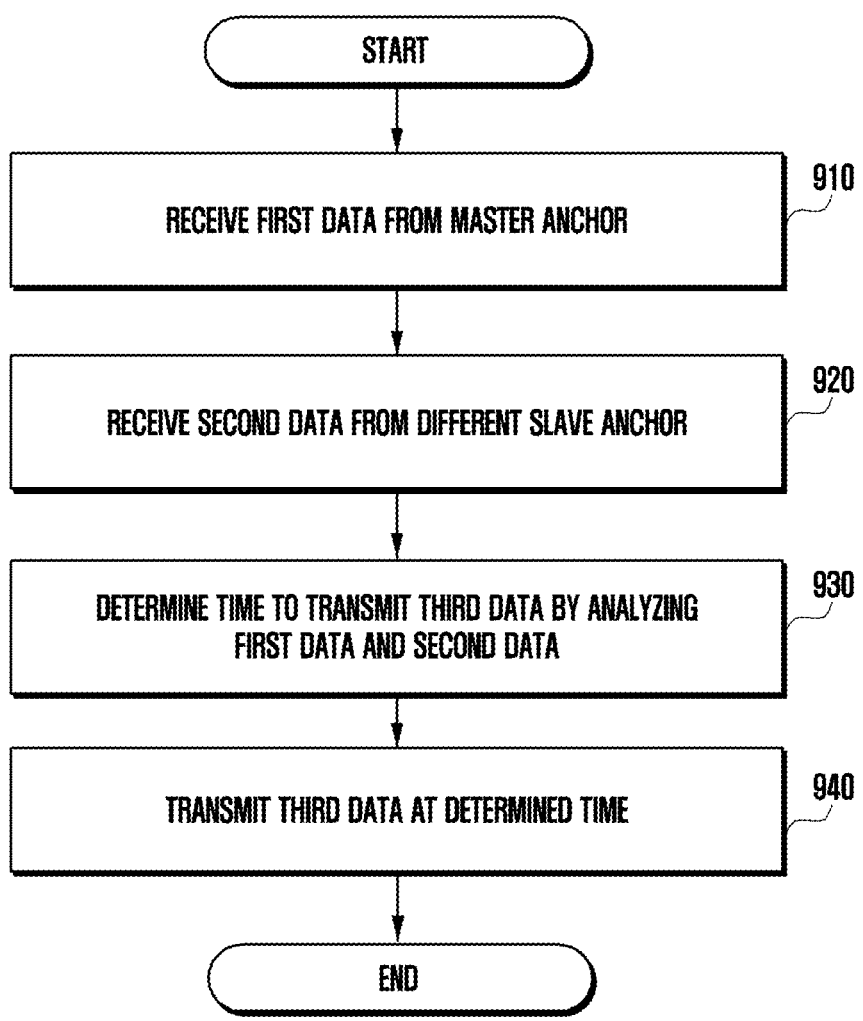
FIG. 9 is a flowchart illustrating a first electronic device supporting location calculation of a second electronic device according to various embodiments of the present disclosure.

FIG. 9 is a flowchart illustrating a slave anchor supporting location calculation of an electronic device according to various embodiments of the present disclosure.

In operation 910, a slave anchor (e.g., the first slave anchor 220 of FIG. 2) may receive first data (e.g., 320 of FIG. 3) transmitted by a master anchor (e.g., the master anchor 210 of FIG. 2). A different slave anchor (e.g., the second slave anchor 230 or the third slave anchor 240 of FIG. 2) may also receive the first data 320 (e.g., UWB frame).

In operation 920, the slave anchor 220 may receive second data transmitted by the different slave anchor 230 or 240. The slave anchor 220 may receive data without distinguishing a transmitter of the data and may analyze the received data when necessary. Optionally, the slave anchor 220 may receive a plurality of pieces of data transmitted by the master anchor 210 without receiving data transmitted by the different slave anchors 230 or 240.

In operation 930, the slave anchor 220 may analyze the first data and the second data to determine a time for the slave anchor 220 to transmit third data. The slave anchor 220 may predict a time for the master anchor 210 to transmit data using Equation 1. The slave anchor 220 may determine the time to transmit the third data using Equation 2 to Equation 5 described above with reference to FIG. 3. The time for the slave anchor 220 to transmit the third data may be a time based on a clock of the master anchor 210. The time for the slave anchor 220 to transmit the third data may be determined using times when the slave anchor 220 receives the first data and the second data, times when the master anchor 210 transmits the first data and the second data, and a time (TOF) taken to reciprocate between the slave anchor 220 and the master anchor 210.

Although it has been described that the slave anchor 220 determines the time to transmit the third data by receiving the data from both the master anchor 210 and the different slave anchor 230 or 240, the slave anchor 220 may also determine the time to transmit the third data by receiving a plurality of pieces of data from the master anchor 210 or by receiving a plurality of pieces of data from the different slave anchor 230 or 240.

In operation 940, the slave anchor 220 may transmit the third data at the determined time. The third data may include identification information or location information about the slave anchor 220. The identification information or location information about the slave anchor 220 may be used by an electronic device (e.g., 250 of FIG. 2) to calculate the location thereof.

The first data, the second data, and the third data may be UWB frames, and may be in high rate pulse mode 1 or 2 (e.g., 710 or 720 in FIG. 7). The first data, the second data, and the third data may include a secure STS code or a non-secure STS code. The first data and the second data may include the times when the master anchor 210 transmits the first data and the second data. The times when the first data and the second data are transmitted may be times based on the clock of the master anchor 210.

Figure 10:
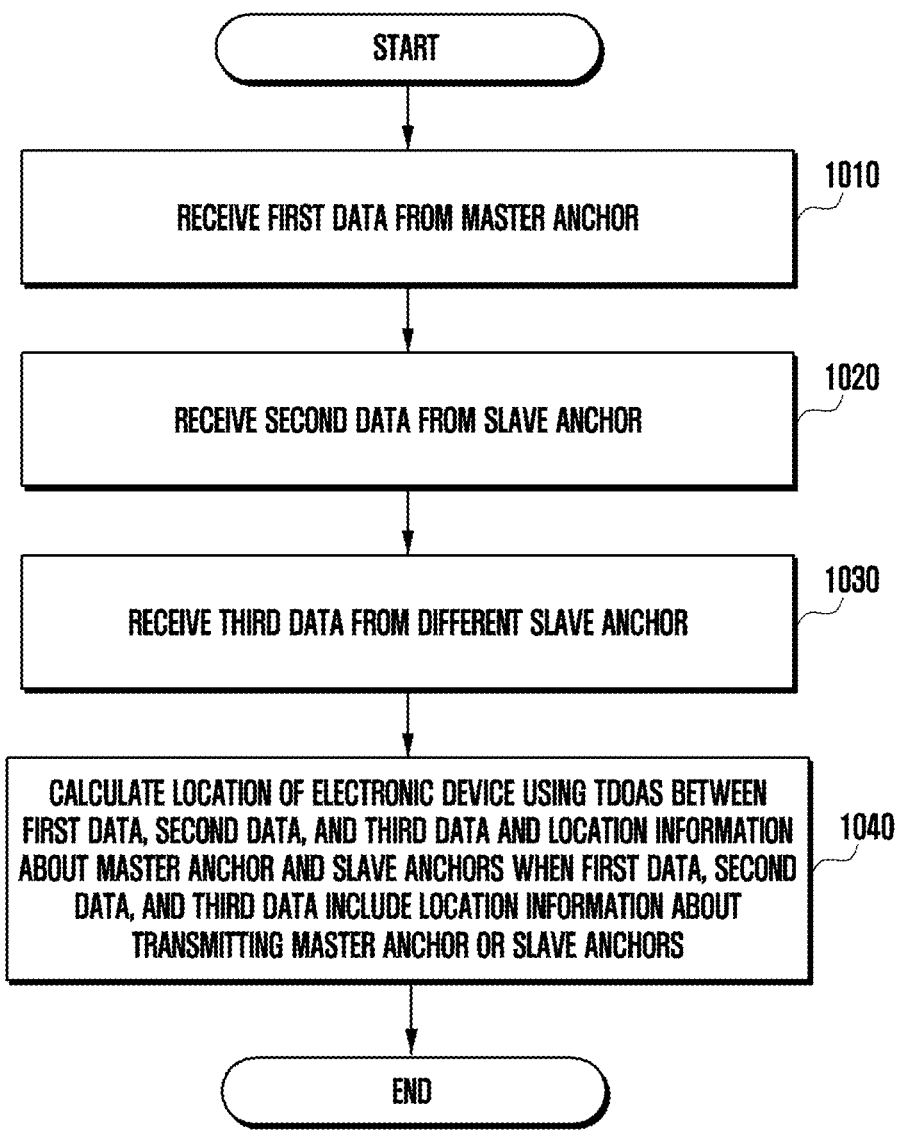
FIG. 10 is a flowchart illustrating a first electronic device calculating a location according to various embodiments of the present disclosure.

FIG. 10 is a flowchart illustrating an electronic device calculating a location according to various embodiments of the present disclosure.

In operation 1010, a communication module (e.g., 190 of FIG. 1) of an electronic device may receive first data (e.g., 320 of FIG. 3) transmitted by a master anchor (e.g., 210 of FIG. 2).

In operation 1020, the communication module 190 of the electronic device may receive second data transmitted by a slave anchor (e.g., 220 of FIG. 2).

In operation 1030, the communication module 190 of the electronic device may receive third data transmitted by a different slave anchor (e.g., 230 of FIG. 2).

In operation 1040, when the first data, the second data, and the third data include location information about the transmitting master anchor or slave anchors, a processor (e.g., 120 of FIG. 1) of the electronic device may calculate the location of the electronic device (e.g., 250 of FIG. 2) using TDOAs between the first data, the second data, and the third data and the location information about the master anchor and the slave anchors.

Although it has been described that the electronic device 250 determines the location thereof when receiving the data from the master anchor 210 and the two slave anchors 220 and 230, the electronic device 250 may determine the location thereof when receiving data from at least three anchors (e.g., 210 to 240 in FIG. 2) regardless of anchor types. Specifically, when receiving data from at least two anchors, the electronic device 250 may determine the location thereof in two dimensions, and when receiving data from three or more anchors, the electronic device 250 may determine the location thereof in three dimensions.

Optionally, when any one of the plurality of pieces of data (e.g., the first data to the third data) does not include the location information about the master anchor 210 or the slave anchors 220 to 240, the electronic device 250 may transmit information necessary to calculate the location of the electronic device (e.g., identification information about the electronic device 250 and TDOAs between the plurality of pieces of data) to a server (e.g., the server 108 of FIG. 1) and may receive location information about the electronic device from the server 108. The first data, the second data, and the third data may be UWB frames and may be in high rate pulse mode 1 or 2 (e.g., 710 or 720 in FIG. 7). The first data, the second data, and the third data may include a secure STS code or a non-secure STS code.

The information necessary to calculate the location of the electronic device may be identification information about the master anchor and/or the slave anchors and a TDOA between the first data and the second data.

According to various embodiments of the present disclosure, the electronic device 250 may estimate times in which the anchors transmit the data using the foregoing method for determining the time for the slave anchor 220 to transmit data. The electronic device 250 may operate to receive data only in the time when the anchors transmit data.

An electronic device 250 according to various embodiments of the present disclosure may include at least one wireless communication module (e.g., 192 of FIG. 1) and a processor (e.g., 120 of FIG. 1), wherein the processor 120 may control the wireless communication module to receive a plurality of pieces of data from a plurality of external electronic devices 210 to 240, respectively, may identify times in which the plurality of pieces of data is respectively received, and may calculate a location of the electronic device using a time difference of arrival between the plurality of pieces of data and location information about the plurality of external electronic devices when the plurality of pieces of data includes the location information about the plurality of external electronic devices.

In the electronic device 250 according to various embodiments of the present disclosure, the plurality of pieces of data may include a scrambled timestamp sequence (STS) code.

In the electronic device 250 according to various embodiments of the present disclosure, when the plurality of pieces of data does not include the location information about the plurality of external electronic devices, the processor 120 may control the wireless communication module to transmit information for calculating the location of the electronic device to a server, and may calculate location information on the electronic device from the server.

In the electronic device 250 according to various embodiments of the present disclosure, the transmitted information for calculating the location of the electronic device may include identification information about the plurality of external electronic devices and the time difference of arrival (TDOA) between the plurality of pieces of data.

In the electronic device 250 according to various embodiments of the present disclosure, the processor 120 may determine a time in which next data is received using the times in which the plurality of pieces of data is received and times in which the plurality of external electronic devices transmits the plurality of pieces of data, respectively.

An electronic device 220 to 240 according to various embodiments of the present disclosure may include at least one wireless communication module (e.g., 192 of FIG. 1) and a processor (e.g., 120 of FIG. 1), wherein the processor 120 may control the wireless communication module to receive a plurality of pieces of data from at least one external electronic device, may determine a time for the electronic device to transmit data, based on the plurality of pieces of received data, and may control the wireless communication module to transmit the data to be transmitted at the determined time, wherein the data to be transmitted may include identification information or location information about the electronic device, and wherein the determined time may be a time determined based on a clock of any one of the external electronic device transmitting the pieces of received data.

In the electronic device 220 to 240 according to various embodiments of the present disclosure, the plurality of pieces of received data may include a scrambled timestamp sequence (STS) code.

In the electronic device 220 to 240 according to various embodiments of the present disclosure, the STS code may include an STS seed and an STS index.

In the electronic device 220 to 240 according to various embodiments of the present disclosure, the processor 120 may determine the time for the electronic device to transmit the data using times in which the electronic device receives the plurality of pieces of data, times in which the at least one external electronic device transmitting the data transmits the plurality of pieces of data, respectively, and a time taken to reciprocate between the electronic device and the external electronic device transmitting the data.

In the electronic devices 220 to 240 according to various embodiments of the present disclosure, the processor 210 may determine relative clock distortions and errors of the electronic device and the electronic device transmitting the data and may determine the time for the electronic device to transmit the data using the relative clock distortions and the errors.

An operating method of an electronic device (e.g., FIG. 10) according to various embodiments of the present disclosure may include: receiving a plurality of pieces of data from a plurality of external electronic devices (210 to 240 of FIG. 2), respectively (e.g., in operations 1010 to 1030); identifying times in which the plurality of pieces of data is respectively received; and calculating a location of the electronic device using a time difference of arrival between the plurality of pieces of data and location information about the plurality of external electronic devices when the plurality of pieces of received data includes the location information about the plurality of external electronic devices (e.g., in operation 1040).

In the operating method of the electronic device according to various embodiments of the present disclosure, the plurality of pieces of received data may include a scrambled timestamp sequence (STS) code.

The operating method of the electronic device according to various embodiments of the present disclosure may further include: controlling the wireless communication module to transmit information for calculating the location of the electronic device to a server (e.g., 108 of FIG. 1) when the plurality of pieces of data does not include the location information about the plurality of external electronic devices; and receiving location information on the electronic device from the server.

In the operating method of the electronic device according to various embodiments of the present disclosure, the transmitted information for calculating the location of the electronic device may include identification information about the plurality of external electronic devices and the time difference of arrival (TDOA) between the plurality of pieces of data.

The operating method of the electronic device according to various embodiments of the present disclosure may further include determining a time in which next data is received using the times in which the plurality of pieces of data is received and times in which the plurality of external electronic devices 210 to 240 transmits the plurality of pieces of data, respectively.

An operating method of an electronic device (e.g., FIG. 9) according to various embodiments of the present disclosure may include: receiving a plurality of pieces of data from at least one external electronic device 220 to 240 (910 and 920); determining a time for the electronic device to transmit data, based on the plurality of pieces of received data (e.g., in operation 930); and transmitting the data to be transmitted at the determined time (e.g., in operation 940), wherein the data to be transmitted may include identification information or location information about the electronic device, and wherein the determined time may be a time determined based on a clock of any one of the external electronic device transmitting the pieces of received data.

In the operating method of the electronic device according to various embodiments of the present disclosure, the plurality of pieces of received data may include a scrambled timestamp sequence (STS) code.

In the operating method of the electronic device according to various embodiments of the present disclosure, the STS code may include an STS seed and an STS index.

In the operating method of the electronic device according to various embodiments of the present disclosure, the determining of the time for the electronic device to transmit the data may be determining the time for the electronic device to transmit the data using times in which the electronic device receives the plurality of pieces of data, times in which the at least one external electronic device transmitting the data transmits the plurality of pieces of data, respectively, and a time taken to reciprocate between the electronic device and the external electronic device transmitting the data.

The operating method of the electronic device according to various embodiments of the present disclosure may further include determining relative clock distortions and errors of the electronic device and the electronic device transmitting the data and determining the time for the electronic device to transmit the data using the relative clock distortions and the errors.

In addition, various embodiments are possible.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
at least one wireless communication interface;
a memory; and
at least one processor operably connected to the at least one wireless communication interface and the memory, wherein the memory stores instructions executable by the at least one processor, which, when executed, cause the electronic device to:

control the wireless communication interface to receive data from a plurality of external electronic devices, respectively, identify reception time instances of the data received, respectively, from the plurality of the external electronic devices, calculate a location of the electronic device using: a) a time difference of arrival (TDOA) identified based on the reception time instances of the data received, respectively, from the plurality of the external electronic devices and b) location information for the plurality of the external electronic devices when the data comprises the location information for the plurality of the external electronic devices, and determine another reception time instance of next data based on the reception time instances of the data received from the plurality of the external electronic devices and transmission time instances of the data that are determined when the plurality of the external electronic devices transmits the data, respectively.

2. The electronic device of claim 1, wherein the data includes a scrambled timestamp sequence (STS) code.

3. The electronic device of claim 1, wherein the memory stores instructions, which, when executed, cause the electronic device to:

when the data does not comprise the location information for the plurality of the external electronic devices, control the wireless communication interface to transmit, to a server, information for calculating the location of the electronic device; and receive, from the server, location information for the electronic device.

4. The electronic device of claim 3, wherein the transmitted information for calculating the location of the electronic device comprises identification information for the plurality of the external electronic devices and the TDOA.

5. An operating method of an electronic device, the method comprising:

receiving first data from a plurality of external electronic devices, respectively;

identifying reception time instances of the data received, respectively, from the plurality of the external electronic devices;

calculating a location of the electronic device using: a) a time difference of arrival (TDOA) identified based on the reception time instances of the data received, respectively, from the plurality of the external electronic devices and b) location information for the plurality of the external electronic devices when the data comprises the location information for the plurality of the external electronic devices; and determining another reception time instance of next data based on the reception time instance of the data from the plurality of the external electronic devices and transmission time instances of the data that are determined when the plurality of external electronic devices transmits the data, respectively.

6. The operating method of claim 5, wherein the data includes a scrambled timestamp sequence (STS) code.

7. The operating method of claim 5, further comprising:

transmitting, to a server, information for calculating the location of the electronic device when the data does not comprise the location information for the plurality of external electronic devices; and receiving, from the server, location information for the electronic device.

8. The operating method of claim 7, wherein the transmitted information for calculating the location of the electronic device comprises identification information for the plurality of external electronic devices and the TDOA.

\* \* \* \* \*